United States Patent Office 3,364,206
Patented Jan. 16, 1968

3,364,206
16α-ALKOXY-10α,9β-UNSATURATED PREGNENE DERIVATIVES
Engbert Harmen Reerink, Pieter Westerhof, and Hendrik Frederik Louis Schöler, Van Houtenlaan, Weesp, Netherlands, assignors to North American Philips Company, Inc., New York, N.Y., a corporation of Delaware
No Drawing. Continuation-in-part of application Ser. No. 201,824, June 12, 1962. This application July 16, 1965, Ser. No. 472,683
15 Claims. (Cl. 260—239.55)

ABSTRACT OF THE DISCLOSURE 16 derivatives of the 9β,10α pregn-4-ene-3,20 dione series. Examples are 15α-methoxy 9β,10α-pregn-4-ene-3,20 dione and 16α-benzyloxy-9β, 10α-pregna-4,6-diene-3,20-dione. The compounds have hormonal activities particularly deciduoma forming properties.

---

This application is a continuation-in-part of our co-pending application Ser. No. 201,824, filed June 12, 1962 and now U.S. Patent 3,198,792.

The invention relates to 9β,10α-steroids of the general formula:

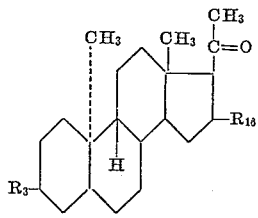

in which formula:

$R_3$ is a 3-keto-4-dehydro group,
   3-keto-4-bisdehydro group,
   3-keto-1,4-bisdehydro-group,
   3-keto-1,4,6-trisdehydro-group or
   3-acyloxy-3,5-bisdehydro-group
$R_{16}$ is an etherified hydroxyl-group.

If $R_3$ is a 3-acyloxy-3,5-bisdehydro-group, the acyloxy-group is preferably the acyloxy-group of an inorganic or of an aliphatic, mono-, di- or tri-carboxylic acid having 1 to 20 carbon atoms or the acyloxy-group of an aromatic or of a mixed aliphatic aromatic carboxylic acid. By way of example the following acyloxy-groups may be mentioned: formoxy, acetoxy, propionoxy, butyroxy and the acyloxy groups of the acids oleic acid, palmitinic acid, stearinic acid, enanthic acid, undecanic acid, caprionic acid, pivelinic acid, succinic acid, malonic acid, citric acid, benzoic acid, p-hexyloxyphenylpropionic acid, sulphuric acid or phosphoric acid.

The hydroxyl-group at carbon atom 16 may be etherified with an aliphatic, an alicyclic, a heterocyclic, a mixed aliphatic alicyclic or a mixed aliphatic, aromatic alcohol. For example aliphatic alcohols having 1 to 6 carbon atoms such as methanol, ethanol, propanol, propanol-2, butanol, tertiary butanol, cyclopentanol, tetrahydropyranol-2, tetrahydrofuranol or benzyl-alcohol.

It should be noted that the stereochemical configuration of the steroid skeleton of the compounds according to the invention at carbon atoms 8, 9, 10, 13 and 14 is the same as that of dihydroisolumisterone at the corresponding carbon atoms. Castells and others (Proc. Chem. Soc., 1958, p. 7) have shown that dihydroisolumisterone has the configuration of 8β, 9β, 10α, 13β, 14α. Normal steroids have the configuration 8β, 9α, 10β, 13β, 14α. The steroids according to the invention are designated by "9β, 10α" in order to indicate at which carbon atoms (9 and 10) the configuration deviates from that of normal steroids and in which sense (9β, 10α instead of 9α, 10β).

In the compounds according to the invention the acetyl-group at carbon atom 17 has the β-configuration. The configuration of the etherified hydroxy-group at carbon atom 16, may be α or β. In this connection it is stated that with microbiological hydroxylation at carbon atom 16 according to the methods hitherto known the hydroxyl-group is introduced in α-configuration. With etherification of the hydroxyl-group thus introduced the total ether function remains, of course, in α-position.

The compounds according to the invention excel by their hormonal activity.

This applies particularly to the 16α-ethoxy compounds e.g. 16α-ethoxy-9β, 10α-pregna-4,6-diene-3,20-dione. This compound has a predominantly peripheral activity administered either orally or parenterally on the uterus, the cervix and vagine. In tests specially devised for the purpose the compound has both orally and parenterally deciduoma-forming properties. The compound is not found to be ovulation inhibiting. The substance induces pseudo-pregnancy with non-castrated and castrated animals. The substance produces furthermore, both orally and parenterally a cervix mucus impenetrable for spermatozoons.

Other compounds according to the invention are:
16α-methoxy-9β,10α-pregn-4-ene-3,20 dione,
16α-ethoxy-9β,10α-pregn-4-ene-3,20-dione,
16α-ethoxy-9β,10α-pregna-1,4,6-triene-3,20-dione,
16α-ethoxy-9β,10α-pregna-1,4-diene-3,20-dione,
16α-methoxy-9β,10α-pregna-1,4,6-triene-3,20-dione,
16α-(2-tetrahydropyranyloxy)-9β,10α-pregn-4-ene-3,20-dione,
16α-(2-tetrahydropyranyloxy)-9β,10α-pregna-4,6-diene-3.20-dione,
16α-tert. butoxy-9β,10α-pregna-4,6-diene-3,20-dione,
16α-tert. butoxy-9β,10α-pregn-4-ene-3,20-dione,
16α-methoxy-9β,10α-pregna-4,6-diene-3,20-dione,
16α-benzyloxy-9β,10α-pregna-4,6-diene-3,20-dione.

In general, particularly those compounds according to the invention are important which contain a hydroxyl-group at carbon atom 16 in α-position, etherified with an aliphatic alcohol having 1 to 6 carbon atoms. It should be noted that this specification of a preferred group of compounds is solely intended as a circumscription of the group of compounds and should not be considered as an indication of the method of producing the same.

The invention furthermore relates to methods of producing the above-mentioned compounds. In general, methods may be employed to this end, which may also be used for the production of analogous compounds.

Moreover, for the introduction of substituents and/or double bonds methods may be used like those employed, as the case may be, for the introduction of these substituents and/or double bonds at the same positions in other steroids, both of the normal series and of the 9β,10α-series.

For the production of the compounds according to the invention the starting material is preferably a 9β,10α-steroid containing a free 16-hydroxyl-group, that is to say a compound of the general formula:

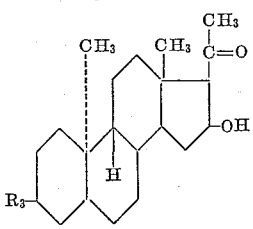

In this formula R₃ has the meaning indicated above.

These compounds can be produced by microbiological hydroxylation of 20-keto-9β,10α-pregnanes, which do not contain substituents at carbon atom 16, for example, with *Sepedonium chrysospermum, Sepedonium ampullosporum* or *Stagonospora curtisii*, as described in Belgian Patent Specifications 638,760 or 638,635.

In the compounds thus produced the introduced hydroxyl-group is in α-position.

The said 16-hydroxy-9β,10α-steroids may be etherified in a conventional manner. It should be considered in this case that the 16-hydroxyl-group can be separated off in some methods whilst forming a 16-dehydro-compound.

Suitable etherifying methods are for example alkylation with a dialkylsulphate, the alkyl-groups of which contain each 1 to 6 carbon atoms in alkaline medium. Very suitable is for example the etherification with diethylsulphate.

In a further method a 16-hydroxy-9β,10α-steroid is treated with an aliphatic halogenide or an aralkyl-halogenide, for example ethylchloride or ethylbromide or benzylchloride in the presence of silver oxide.

In a further method a 16-hydroxy-9β,10α-steroid can be converted by treating it with dihydropyrane in an acidic medium into the corresponding 2-tetrahydropyranoylether. Such a reaction may also be carried out with dihydrofurane, in which case the corresponding 2-tetrahydrofuranoylether is formed.

A suitable method is that in which a 16-hydroxy-9β,10α-steroid is reacted with an aliphatic alcohol having 1 to 6 carbon atoms in the presence of a concentrated acid, for example sulphuric acid or a concentrated base, for example sodium hydroxide or sodium methylate.

According to a quite different method an aliphatic alcohol having 1 to 6 carbon atoms is added to a 16-dehydro-9β,10α-steroid. This reaction, the starting compound of which is produced by dehydration of the corresponding 16-hydroxyl-compound, provides often a better yield than in the case of direct etherification of the 16-hydroxyl-compound. The addition to 16-dehydro-compounds yields also good results, if R₃ is a 3-keto-1,4-bisdehydro-group or a 3-keto-1,4,6-trisdehydro-group.

The introduction of a double bond between the carbon atoms 1 and 2 into 16-alkoxy-compounds may be carried out by treating a 3-keto-4-dehydro- or a 3-keto-4,6-bisdehydro-9β,10α-steroid, with 2,3-dichloro-5,6-dicyanobenzoquinon, if desired in the presence of an acid or with selenium dioxide.

A 6-dehydro-double bond can be introduced by treatment with 2,3-dichloro-5,6-dicyano-benzoquinone in an acidic medium or with chloranyl.

In the case of etherified 16-hydroxy-9β,10α-steroids, which contain a 3-alkoxy-3,5-bisdehydro-grouping, conversion can be carried out into a 3-keto-4,6-bisdehydro-compound by treatment with manganese dioxide in a neutral or weakly acidic medium.

The compounds according to the invention may be worked up to pharmaceutic or veterinary preparations in a conventional manner. Injection liquids are produced by dissolving a compound according to the invention in methylene chloride, by dissolving this solution in arachide oil and by evaporation subsequently the methylene chloride. Suppositories may be produced by intimately mixing an active compound with an ester of a higher aliphatic alcohol and a higher aliphatic carboxylic acid, for example, carbo waxes or cacaobutter or a mixture of gelatine and glycerol. The compounds according to the invention may furthermore be worked up in tablets with the conventional fillers such as starch or binders or lubricants, for example magnesium stearate, carboxymethylcellulose and the like.

EXAMPLES (1) *Production of 16α-ethoxy-9β,10α-pregna-4,6-diene-3,20-dione from 16α-hydroxy-9β,10α-pregna-4,6-diene-3,20-dione.*—10 gs. of 16α-hydroxy-9β,10α-pregna-4,6-diene-3,20-dione (obtained by conversion of 9β,10α-pregna-4,6-diene-3,20-dione with *Sepedonium ampullosporum*) was dissolved at about 60° C. in 200 mls. of ethanol. To this warm solution was added 10 mls. of a 2 N sodiumhydroxide solution in water. After 30 minutes to one hour the then yellow-brown solution was neutralised by adding 10 mls. of a 2 N hydrchloric acid solution. The alcohol was distilled off in vacuo and the residue was dissolved in 50 mls. of methylene chloride. This solution was washed in order of succession with a ½ N sulphuric acid solution, a sodium bicarbonate solution and water. After drying on sodium-sulphate the solvent was distilled off in vacuo. The residue—about 9.8 gs.—was then chromatographed through silicagel. The yield was a quantity of 5.8 gs. of 16α-methoxy-9β,10α-pregna-4,6-diene-3,20-dione, which had, after one crystallisation from ether, a melting point of 116° to 117°. In the infrared the following bands could be found: 1700, 1670, 1630, 1590, 1350, 1233, 1100 and 890 cm.⁻¹.

(2) *Production of 16α-ethoxy-9β,10α-pregna-4,6-diene-3,20-dione from 9β,10α-pregna-4,6,16-triene-3,20-dione.*—To a solution of 10 gs. of 9β,10α-pregna-4,6,16-triene-3,20,dione in 50 mls. of absolute ethanol was added two drops of concentrated sulphuric acid. The reaction mixture was allowed to stand at room temperature for 20 hours, after which the acid was neutralised by adding 0.5 N sodiumhydroxide solution. The reaction mixture was worked up as described under 1. Yield 3.20 gs. of 16α-ethoxy-9β,10α-pregna-4,6-diene-3,20-dione with a melting point of 115–116.5°. $\lambda_{max.}=284$: $\epsilon=27,500$.

(3) *Production of 16α-methoxy-9β,10α-pregna-4-ene-3,20-dione from 9β,10α-pregna-4,16-diene-3,20-dione.*—A solution of sodium methylate (1 N) in methanol (50 mls.) was added to a solution of 10 gs. of 9β,10α-pregna-4,16-diene-3,20-dione in 50 mls. of methanol. After 20 hours at room temperature the reaction mixture was worked up as indicated under 1. Yield 5.1 gs. of 16α-methoxy-9β,10α-pregn-4-ene-3,20-dione, melting point 138–140°. Infrared absorption bands inter alia: 1700, 1662, 1620, 1220, 1110, 1094 and 857 cm.⁻¹.

(4) *Production of 16α-methoxy-9β,10α-pregna-4,6-diene-3,20-dione.*—This compound was obtained from 16α-hydroxy-9β,10α-pregna-4,6-diene-3,20-dione in the manner described in Example 3. Melting point 43–44° C. $\lambda_{max.}=284$ mμ; $\epsilon=28,900$.

(5) 2 gs. of 16α-ethoxy-9β,10α-pregna-4,6-diene-3,20-dione was dissolved in chloroform and this solution was homogeneously mixed with 194 gs. of lactose. The mixture was dried at 40° C. for one hour. The mixture was wetted with a 10% aqueous solution of 2 gs. of gelatine and then ground through a 20-mesh sieve. The mixture was dried at 40° C. for 24 hours, after which the grains were ground through a 20-mesh sieve. The mixture was weighed, after which proportional quantities of talcum venetum and magnesium stearate of at the most 25 mgs. and 2 mgs. respectively were added. The mixture obtained was homogenized and worked up to tablets of 225 mgs. each.

6. Injection liquids of 16α-ethoxy-9β,10α-pregn-4-ene-3,20-dione were prepared as follows.

5.00 gs. of the active ingredient was dissolved in 90 mls. of a solution of 2% of anhydrous benzylalcohol and 46% of anhydrous benzylbenzoate in ricinous oil at a temperature of 60° C. The solution was cooled to room temperature and completed to 100 mls. with the said ricinous oil solution. The mixture was homogenised by stirring and filtered. Ampullae and flasks were filled with the filtered solution, then decanted and sterilized by heating at 120° for one hour.

7. In the same manner as described in Example 3 was 9β,10α-pregna-4,6, 16-trien-3,20-dion reacted with benzylalcohol in the presence of potassium hydroxide to produce 16α - benzyloxy-9β,10α-pregna-4-6-dien-3,20-dione. The product was obtained in the amorphous state. $\lambda_{max.}=284.5$; $\epsilon=27.000$.

The same product was obtained when 9β,10α-pregna-4,6,16-trien-3,20-dion was reacted with sodiumbenzylate.

What is claimed is:

1. 9β,10α-steroids of the general formula

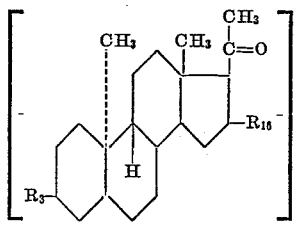

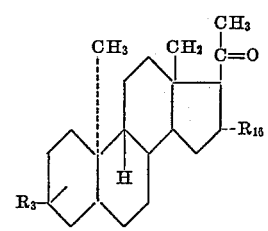

wherein $R_3$ is a member selected from the group consisting of the 3-keto-4-dehydro system, 3-keto-4,6-bisdehydro system, 3 keto-1,4-bisdehydro system, 3-keto-1,4,6-trisdehydro system and the 3-alkoxy-3,5-bisdehydro system wherein the acyloxy group is the acyloxy radical of an acid selected from the group consisting of aliphatic carboxylic acids of 1–20 carbon atoms, benzoic acid, p-hexyloxyphenyl-propionic acid, sulfuric acid and phosphoric acid and $R_{16}$ is a member selected from the group consisting of alkoxy of 1–6 carbon atoms, 2-tetrahydropyranyloxy, benzyloxy, cyclopentoxy and tetrahydrofuranoxy.

2. A compound of the formula:

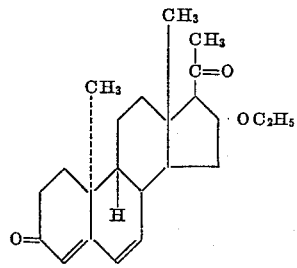

3. A compound of the formula:

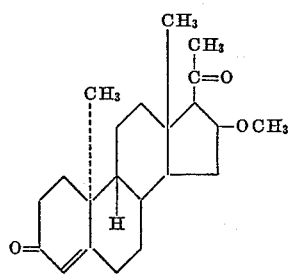

4. A compound of the formula:

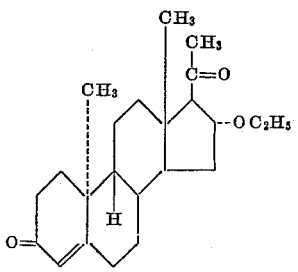

5. A compound of the formula:

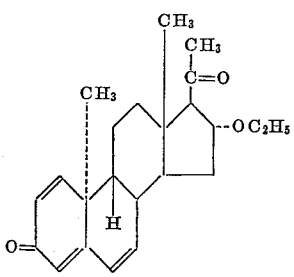

6. A compound of the formula:

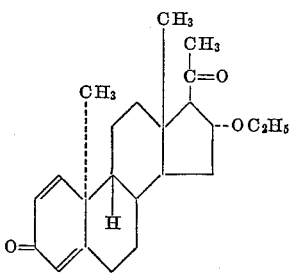

7. A compound of the formula:

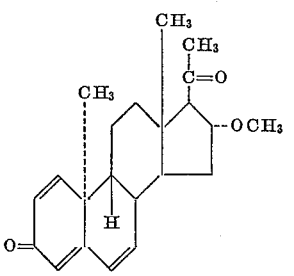

8. A compound of the formula:

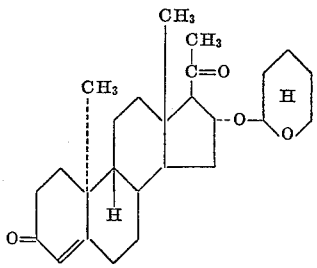

9. A compound of the formula:

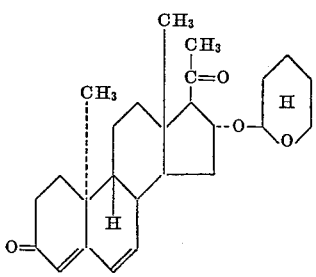

10. A compound of the formula:
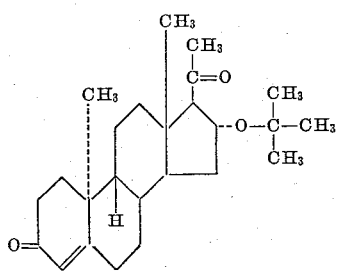
11. A compound of the formula:
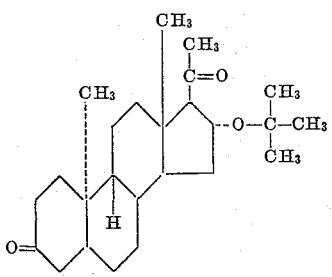
12. A compound of the formula:
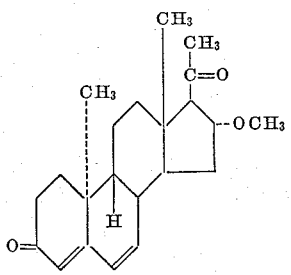
13. A compound of the formula:
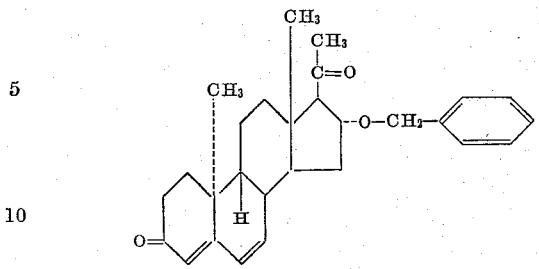
14. A compound of the formula:
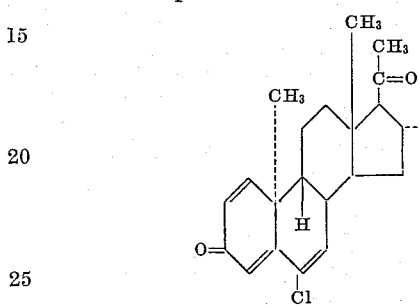
15. A compound of the formula:
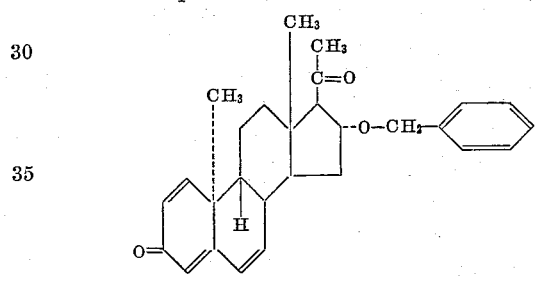
No references cited.
ELBERT L. ROBERTS, *Primary Examiner.*

UNITED STATES PATENT OFFICE
CERTIFICATE OF CORRECTION

Patent No. 3,364,206                         January 16, 1968

Engbert Harmen Reerink et al.

It is hereby certified that error appears in the above numbered patent requiring correction and that the said Letters Patent should read as corrected below.

Column 1, line 16, for "15α-methoxy" read -- 16α- methoxy --; column 7, lines 15 to 25, the formula should appear as shown below instead of as in the patent:

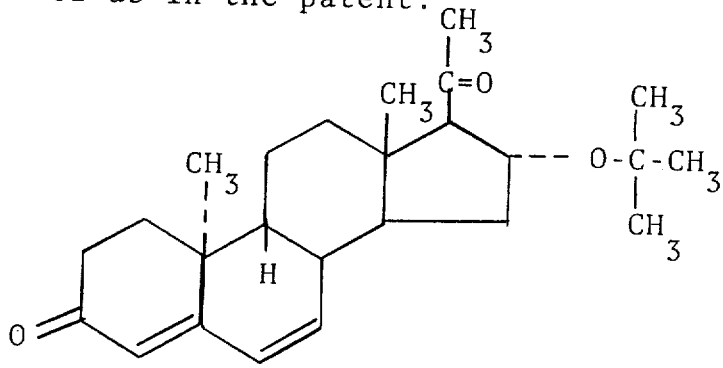

Signed and sealed this 22nd day of July 1969.

(SEAL)
Attest:

EDWARD M. FLETCHER, JR.
Attesting Officer

WILLIAM E. SCHUYLER, JR.
Commissioner of Patents